(12) United States Patent
Cyzen

(10) Patent No.: US 10,439,327 B1
(45) Date of Patent: Oct. 8, 2019

(54) PLUG RETENTION POWER OUTLET WALL PLATE

(71) Applicant: Keith Cyzen, Glen Ellyn, IL (US)

(72) Inventor: Keith Cyzen, Glen Ellyn, IL (US)

( * ) Notice: Subject to any disclaimer, the term of this patent is extended or adjusted under 35 U.S.C. 154(b) by 0 days.

(21) Appl. No.: 16/190,640

(22) Filed: Nov. 14, 2018

Related U.S. Application Data

(60) Provisional application No. 62/696,057, filed on Jul. 10, 2018.

(51) Int. Cl.
| | |
|---|---|
| *H01R 13/639* | (2006.01) |
| *H01R 25/00* | (2006.01) |
| *H02G 3/14* | (2006.01) |
| *H01R 27/02* | (2006.01) |

(52) U.S. Cl.
CPC ....... *H01R 13/6395* (2013.01); *H01R 25/006* (2013.01); *H01R 27/02* (2013.01); *H02G 3/14* (2013.01)

(58) Field of Classification Search
CPC .... H01R 13/62; H01R 13/6395; H01R 24/76; H01R 25/006; H02G 3/14; H02G 3/18; H02J 2007/0062
See application file for complete search history.

(56) References Cited

U.S. PATENT DOCUMENTS

| | | |
|---|---|---|
| 2,438,143 A | 3/1948 | Brown |
| D162,509 S | 3/1951 | Austin, Jr. |
| 2,673,969 A | 3/1954 | Pfister |
| 2,722,665 A | 11/1955 | Sauder |
| 2,770,697 A | 11/1956 | Kellett |
| 3,013,105 A | 12/1961 | Craig |
| 3,113,996 A | 12/1963 | Sanford |
| 3,159,446 A | 12/1964 | Protzmann |
| 3,257,497 A | 6/1966 | Chase |
| 3,689,868 A | 9/1972 | Snyder |
| 3,775,729 A | 11/1973 | Casper |
| 4,083,618 A | 4/1978 | Busch, Jr. |
| D261,135 S | 10/1981 | Horne |
| 4,457,571 A | 7/1984 | Lavine et al. |
| D275,175 S | 8/1984 | Rolli, Jr. |
| D283,221 S | 4/1986 | West |
| 4,617,613 A | 10/1986 | Rice |
| 4,895,527 A | 1/1990 | Brown et al. |
| 4,895,999 A | 1/1990 | Calderon |
| 4,921,444 A | 5/1990 | Cama |
| D308,626 S | 6/1990 | Villarreal |
| D309,093 S | 7/1990 | Reinholt |
| 4,969,833 A | 11/1990 | Lindow et al. |
| 4,973,801 A | 11/1990 | Frick et al. |

(Continued)

OTHER PUBLICATIONS https://www.amazon.com/Lock-Plug-Electrical-Extension-Appliances/dp/B06WW61RRC, publicly available at least as early as Dec. 17, 2017.

(Continued)

*Primary Examiner* — Vanessa Girardi
(74) *Attorney, Agent, or Firm* — Marshall, Gerstein & Borun LLP

(57) ABSTRACT

Power outlet wall plates having retention components are described herein that are configured to be mounted around power outlets to thereby retain power cords in electrical engagement with sockets of the power outlets. The retention components can be secured to the structure using any suitable mechanism, such as by using fasteners, snap fit, and so forth.

34 Claims, 9 Drawing Sheets

(56) References Cited

U.S. PATENT DOCUMENTS

| | | | |
|---|---|---|---|
| 4,993,963 A * | 2/1991 | Pedigo | H01R 13/447 |
| | | | 174/67 |
| 5,011,427 A | 4/1991 | Martin | |
| D317,859 S | 7/1991 | Kobayashi | |
| D318,460 S | 7/1991 | Heath et al. | |
| 5,174,773 A | 12/1992 | Jones | |
| D346,362 S | 4/1994 | Bouley | |
| D359,271 S | 6/1995 | Reinholt | |
| D372,224 S | 7/1996 | Larned et al. | |
| 5,575,677 A | 11/1996 | Buckner et al. | |
| 5,589,665 A | 12/1996 | Scamacca | |
| 5,655,924 A | 8/1997 | Cross et al. | |
| D415,113 S | 10/1999 | Driver, III | |
| 5,989,052 A | 11/1999 | Fields et al. | |
| 6,699,060 B1 | 3/2004 | Scott | |
| D508,025 S | 8/2005 | Dirks | |
| D509,193 S | 9/2005 | Piedmont | |
| 7,014,493 B1 * | 3/2006 | Battard | H01R 13/6395 |
| | | | 439/371 |
| 7,041,905 B1 | 5/2006 | Stewart | |
| 7,056,145 B2 | 6/2006 | Campbell, III et al. | |
| D549,175 S | 8/2007 | Slasinski | |
| 7,255,588 B2 | 8/2007 | Wilder | |
| D559,782 S | 1/2008 | Slasinski | |
| 7,371,105 B1 | 5/2008 | Allende | |
| 7,384,304 B1 | 6/2008 | Fawcett | |
| 7,528,323 B2 | 5/2009 | Wu et al. | |
| 7,638,710 B1 | 12/2009 | Vance | |
| 7,850,478 B2 | 12/2010 | Lin et al. | |
| 8,021,174 B1 | 9/2011 | Schutte | |
| 8,337,236 B2 | 12/2012 | Shu | |
| 8,864,517 B2 | 10/2014 | Cohen | |
| 9,048,570 B2 * | 6/2015 | Goel | H01R 13/703 |
| 9,065,263 B2 | 6/2015 | Porcano | |
| 9,147,973 B1 | 9/2015 | Madison | |
| 9,337,676 B2 | 5/2016 | Benigno | |
| 9,350,151 B2 | 5/2016 | Michaelis, IV | |
| D784,791 S | 4/2017 | Aragaw | |
| D788,045 S | 5/2017 | Zeng | |
| 9,653,898 B1 | 5/2017 | Deaton et al. | |
| D793,846 S | 8/2017 | Armstrong, Jr. et al. | |
| 9,825,414 B2 | 11/2017 | Armstrong et al. | |
| 9,991,627 B1 | 6/2018 | Hemme | |
| D823,263 S | 7/2018 | Cyzen | |
| 2011/0070756 A1 | 3/2011 | Peckham | |
| 2015/0147908 A1 | 5/2015 | Jauch | |

OTHER PUBLICATIONS https://www.amazon.com/LectraLock-Safety-Electrical-Outlet-Duplex/dp/B009UX0NBO/ref=zg_bs_166867011_6?_encoding=UTF8&refRID=EMGGM%E2%80%A6, publicly available at least as early as Dec. 17, 2017.

https://www.amazon.com/gp/offer-listing/B073V3LR2R/ref=dp_olp_new_mbc?ie=UTF8&condition=new, publicly available at least as early as Dec. 17, 2017.

https://www.amazon.com/Secure-Connect-Electrical-Safety-Product/dp/B0083V4NG0/ref=pd_sbs_107_5?_encoding=UTF8&pd_rd_i=B0083V4NG0&p%E2%80%A6, publicly available at least as early as Dec. 17, 2017.

https://www.kickstarter.com/projects/1881196998/myplug-the-first-theft-proof-charging-cable-ever-m?ref=nav_search, publicly available at least as early as Dec. 17, 2017.

http://ideas.northwestern.edu/projects/charger+.html, publicly available at least as early as Dec. 17, 2017.

http://www.ichargerlock.com/, publicly available at least as early as Dec. 17, 2017.

ttps://www.kickstarter.com/projects/1881196998/myplug-the-first-theft-proof-charging-cable-ever-m?ref=nav_search, publicly available at least as early as Dec. 17, 2017.

International Search Report and Written Opinion of the International Searching Authority for International Application PCT/US2018/043358, dated Oct. 9, 2018.

* cited by examiner

PLUG RETENTION POWER OUTLET WALL PLATE

CROSS-REFERENCE TO RELATED APPLICATIONS

Priority is claimed to U.S. Provisional Application 62/696,057, filed on Jul. 10, 2018, and the entire contents thereof are incorporated herein by reference.

FIELD OF THE DISCLOSURE

The present disclosure generally relates to plugs for electronic devices and, more particularly, to retention components for electrical outlets.

BACKGROUND

Cords to recharge and connect mobile devices have taken on many forms with advances in technology. In one current form, a cord includes a connector at a first end thereof that is configured to connect to the mobile device and another connector at a second end to connect to a power source or second electronic device. One common connector for the second end is a Universal Serial Bus (USB) connector that allows the mobile device to be connected to a computing device or power source having a corresponding port.

SUMMARY

In accordance with a first example aspect, a power outlet wall plate for securing a plug of an electrical cord to a power outlet having spaced sockets is described. The power outlet wall plate includes a plate with interior edges that define a window opening that is sized to extend around the power outlet. A casing of the power outlet wall plate includes side portions that extend outwardly from the plate and a retention portion that extends between the side portions, where the retention portion defines a slot opening that extends over the window opening to align with the sockets of the power outlet. Additionally, the slot opening includes lateral portions having a width sized to receive a wire extending from the plug of the electrical cord therethrough and the side portions are sized so that the retention portion prevents the plug from being removed from the socket with the plate secured around the power outlet.

According to one form, the side portions can be side walls and the retention portion can be a retention wall. In this form, the casing can further include end walls that extend between the side walls and are connected to the retention wall such that the casing comprises a housing defining an interior. According to further forms, the housing can be integral with the plate, the housing can include a flange that projects laterally outwardly from the retention wall, and/or the end walls can include inwardly projecting intermediate portions such that the housing has a waisted configuration.

According to another form, the casing can include rod portions that are mounted to the plate, where each of the side portions and the retention portions include opposing rod portions. According to further forms, the casing can include tabs that project outwardly from ends of the side portions opposite the retention portion and the plate can include recesses that have openings into the window portion to receive the tabs to mount the casing to the plate, and/or the casing can be a continuous rod member bent to form the side and retention portions.

According to some forms, the slot opening can include a bulge portion between lateral portions or a waisted portion between the lateral portions.

According to several forms, the plug can be a USB plug and the socket can be a USB socket, such that the side portions are sized so that the retention portion prevents the USB plug from being removed from the USB socket with the plate secured around the power outlet. In a further form, the sockets can be USB sockets spaced laterally from one another and the power outlet can include two or three prong sockets that are spaced longitudinally from one another with the USB sockets disposed therebetween. In these forms, the casing can be configured to extend over the USB sockets while leaving the two or three prong sockets exposed.

BRIEF DESCRIPTION OF THE DRAWINGS

The above needs are at least partially met through provision of the plug retention embodiments described in the following detailed description, particularly when studied in conjunction with the drawings, wherein.

Figure 1:
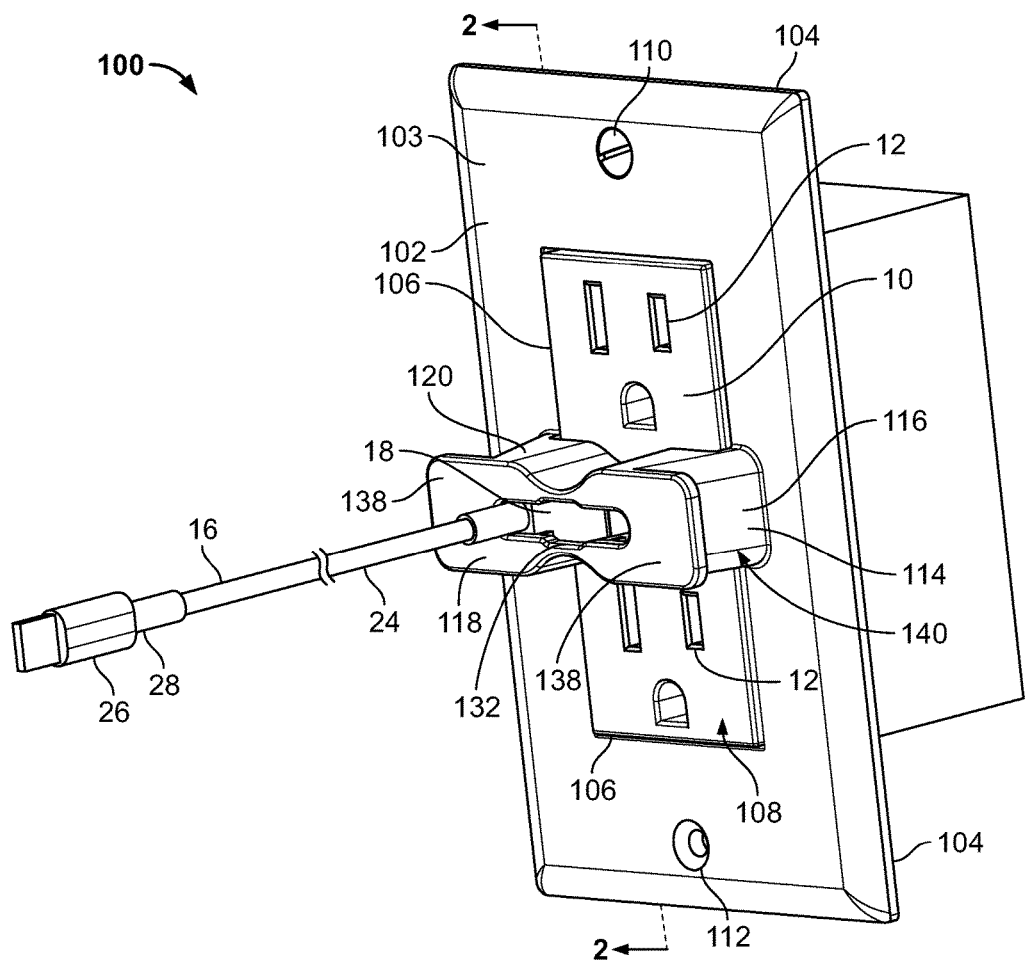
FIG. 1 is a perspective view of a first example retention wall plate in accordance with various embodiments of the present disclosure showing the wall plate mounted around a power outlet and retaining a plug therein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Power outlet wall plates having retention components are described herein that are configured to couple to structure adjacent to power outlets to thereby retain power cords in electrical engagement with sockets of the power outlets. The retention components can be secured to the structure using any suitable mechanism, such as by using fasteners, snap fit, and so forth.

A first example power outlet wall plate 100 is shown in FIGS. 1-4. The wall plate 100 includes a plate 102 with a generally planar wall 103 having outer edges 104 and interior edges 106 defining a central window 108. The window 108 is shaped and sized to extend around a power outlet 10 and the wall plate 100 can secure around the power outlet 10 by any suitable mechanism, such as with fasteners 110 through openings 112 aligned with mounting structure (not shown) of the power outlet 10. If desired, the outer edges 104 can have a chamfered or rounded configuration as shown.

Figure 2:
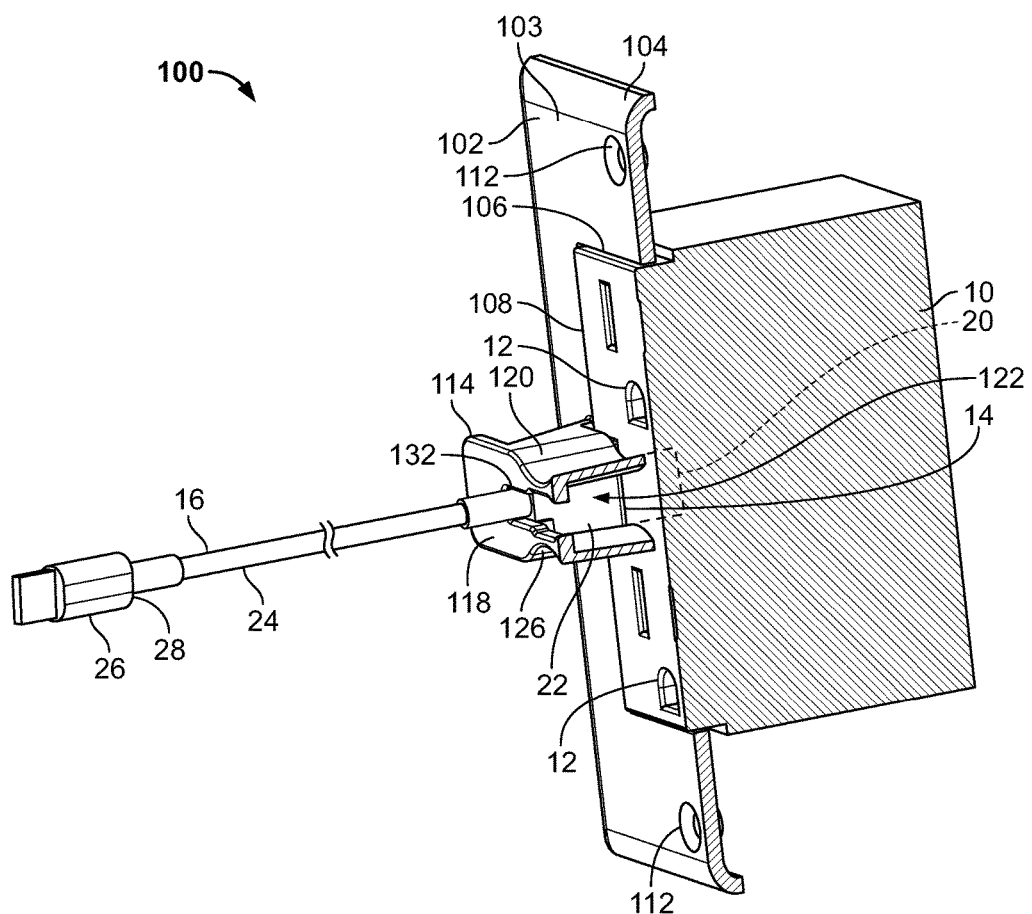
FIG. 2 is a cross-sectional view of the wall plate, power outlet, and plug of FIG. 1 taken along the line 2-2.
Figure 3:
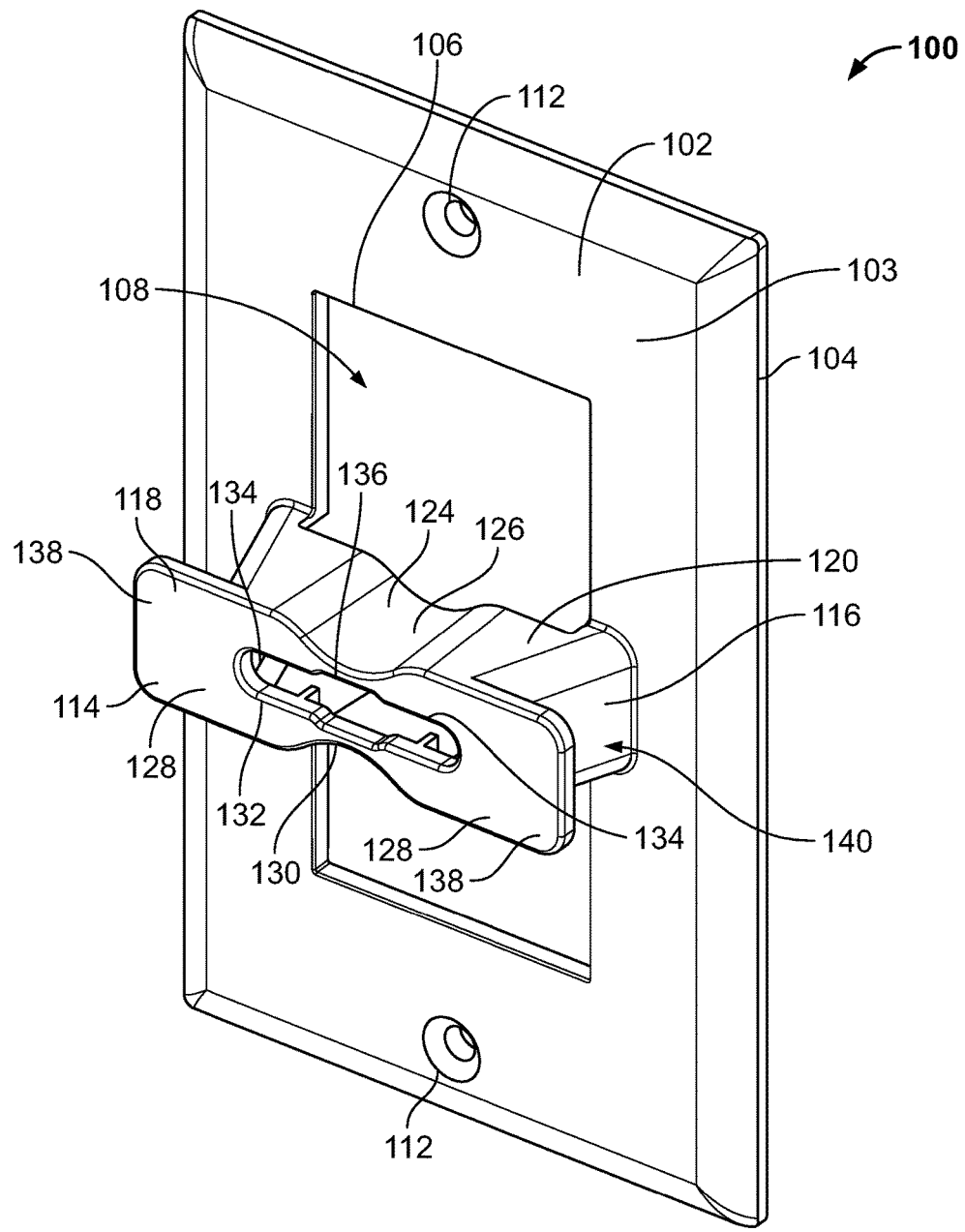
FIG. 3 is a front perspective view of the wall plate of FIG. 1.

The power outlet 10 can take any suitable form. For example, as shown in FIGS. 1 and 2, the power outlet 10 can include one or more conventional two or three prong sockets 12 and one or more USB sockets 14. In the illustrated form, the power outlet 10 includes two prong sockets 12 disposed in a stacked longitudinal relation and two USB sockets 14 disposed in a laterally spaced relation between the prong sockets 12. So configured, the power outlet 10 is suitable for use with an electrical cord 16 having a USB connector 18 with a forward plug portion 20 and a rear body portion 22. A user can couple the USB connector 18 to the USB socket 14 by inserting the plug portion 20 therein.

In order to provide plug retention, the wall plate 100 further includes a casing 114 having side portions 116 extending outwardly from the plate 102 and a retention portion 118 extending between the side portions 116 over the window 108. The side portions 116 can be disposed adjacent to the interior edges 106 of the plate 102 and the retention portion 118 can be configured to extend over the USB sockets 14 of the power outlet 10. In some versions, the side portions 116 can have generally the same dimensions, so that the retention portion 118 extends within a plane that runs generally parallel to the plane of the plate 102. Further, the casing 114 can be sized to have a height generally corresponding to a height of the USB sockets 14 to leave the two or three prong sockets 12 fully accessible above and below the casing 114.

Figure 4:
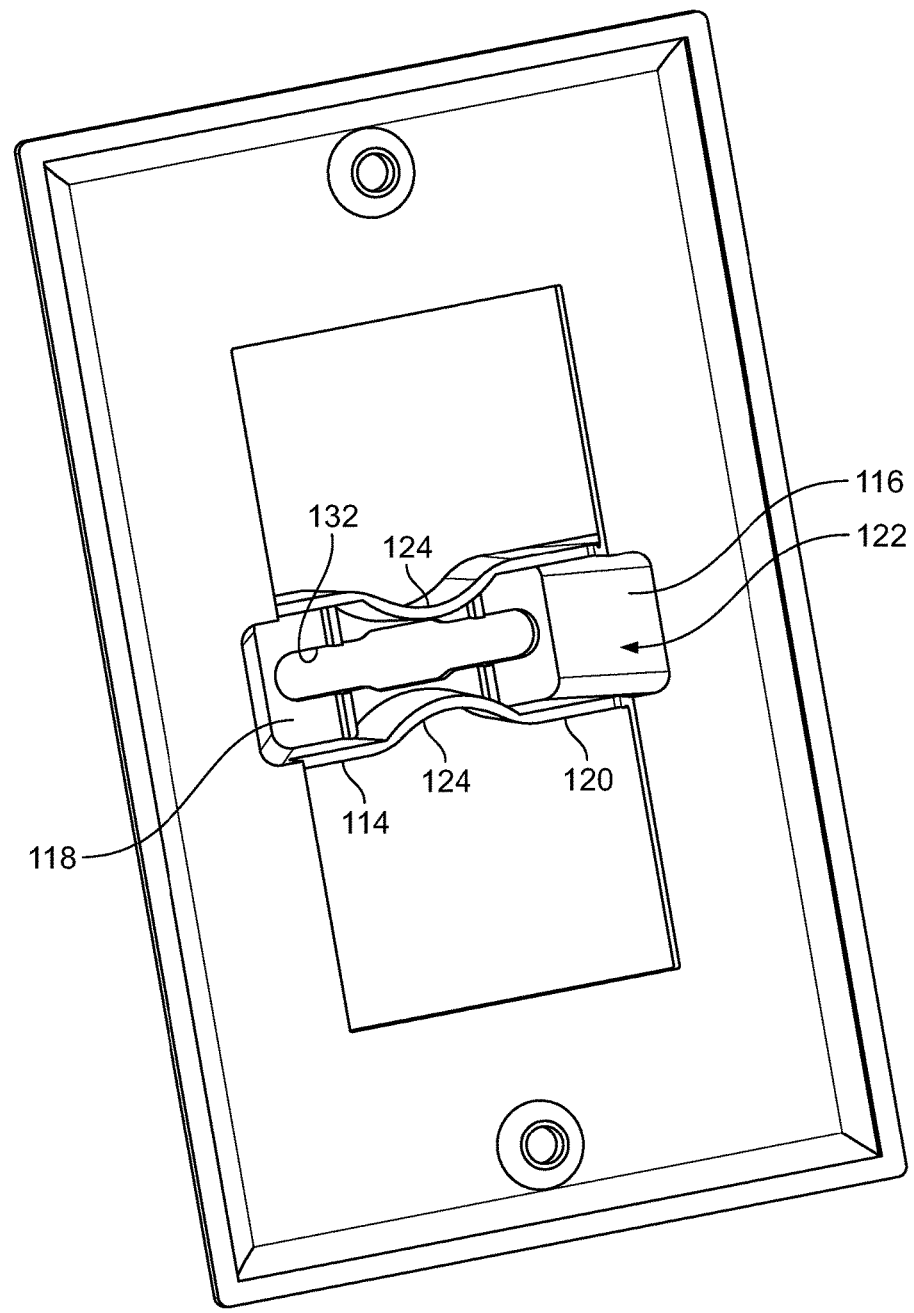
FIG. 4 is a rear perspective view of the wall plate of FIG. 1.

As shown, in this form, the side portions 116 are side walls and the retention portion 118 is a retention wall. Further, the casing 114 includes end walls 120 that extend between the side walls 116 and connect to the retention wall 118 so that the casing 114 has a housing configuration with the walls 116, 118, 120 defining a casing interior 122 (FIG. 4). In the illustrated form, the end walls 120 include inwardly projecting portions 124 (FIG. 3) giving the housing a waist 126 disposed between lateral end portions 128 configured to be positioned over the USB sockets 14. With this configuration, the retention wall 118 can include a corresponding waisted portion 130 following the contours of the end walls 120.

The side walls 116 are sized to extend outwardly from the plate 102 a distance associated with the USB connector 18. For example, the distance can be in a range between the length of the body portion 22 and less than a distance of the length of the body portion 22 combined with the plug portion 20. So configured, when the wall plate 100 is secured around the power outlet 10, the retention wall 118 prevents the plug portion 20 from either from being moved or from being fully removed from the USB socket 14.

The retention wall 118 defines a slot opening 132 that extends in a lateral direction between the side walls 116 to align with the window 108. More specifically, the slot opening 132 extends over the USB sockets 14 with lateral end portions 134 each aligned with one of the USB sockets 14. The slot opening 132 has a width sized to receive a wire 24 of the electrical cord 16 therethrough when the casing 114 retains the USB connector 18 in the socket 14. This configuration allows a user to access and utilize a second connector 26 at the opposite end 28 of the electrical cord 16. In some forms, the slot opening 132 can further include a bulged intermediate portion 136 disposed between the lateral end portions 134.

Further, if desired, the casing 114 can include flanges 138 that project outwardly from the side walls 116 as shown or end walls 120. In some versions, the flanges 138 can form a part of or otherwise be coplanar with the retention wall 118. The flanges 138 can advantageously be utilized in combination with the side and end walls 116, 120 and the plate 102 to define a track 140 to wrap the wire 24 of an unused electrical cord 16 therearound.

It should be appreciated that the foregoing wall plate 100 are preferably constructed by injection molding, casting, machining, 3D printing, or any other practical and available means known to those skilled in the art. In some versions, the casing 114 can be integrally formed with the plate 102.

A second example power outlet wall plate 200 is shown in FIGS. 5-9. The wall plate 200 includes a plate 202 with a generally planar wall 203 having outer edges 204 and interior edges 206 defining a central window 208. The window 208 is shaped and sized to extend around a power outlet 10 and the wall plate 200 can secure around the power outlet 10 by any suitable mechanism, such as with fasteners through openings aligned with mounting structure (not shown) of the power outlet 10, adhesive, snap fit, and so forth. If desired, the outer edges 204 can have a chamfered or rounded configuration as shown. As discussed above, the power outlet 10 can take any suitable form, including two prong sockets 12 disposed in a stacked longitudinal relation and two USB sockets 14 disposed in a laterally spaced relation between the prong sockets 12.

Figure 5:
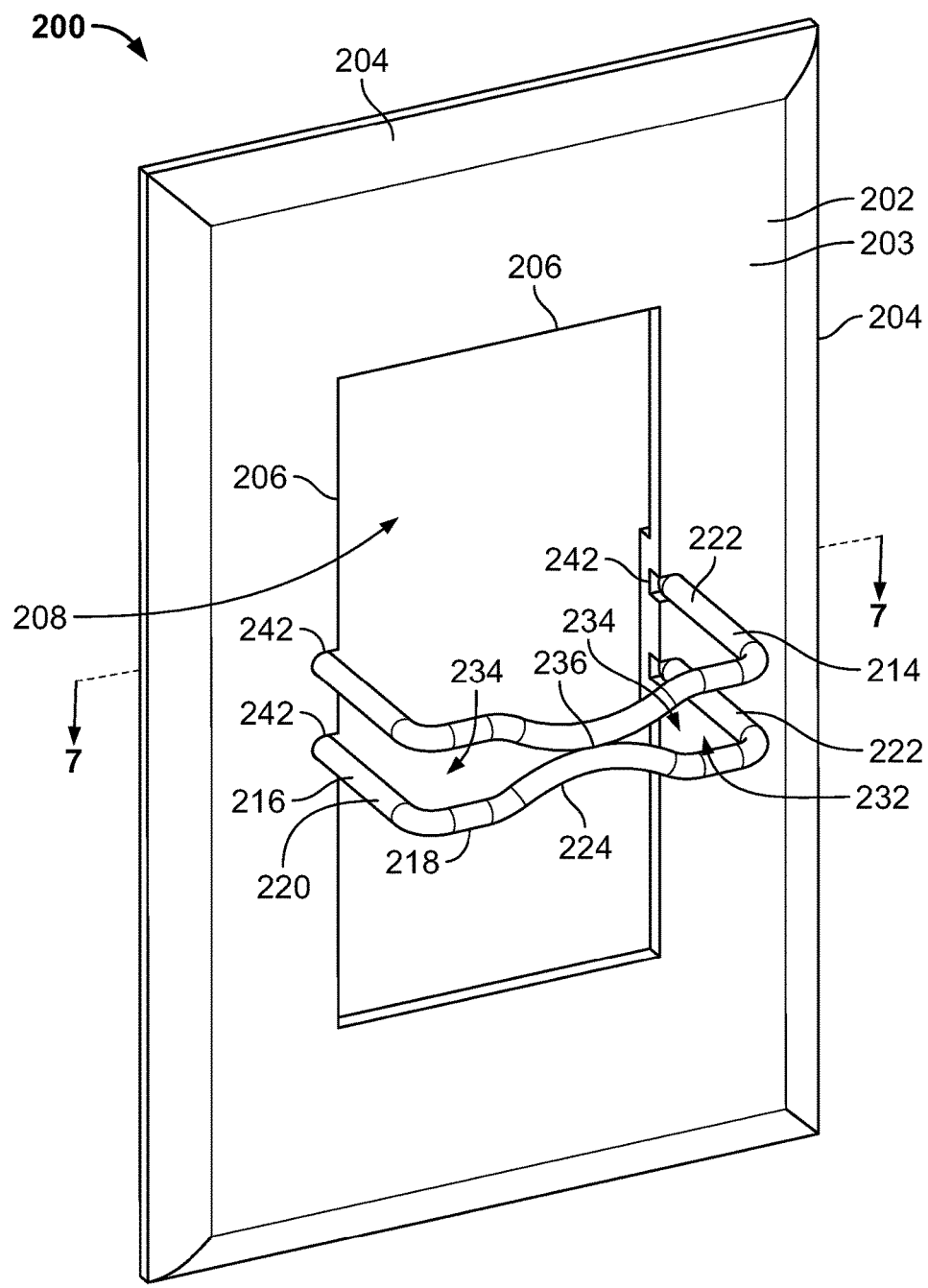
FIG. 5 is a perspective view of a second example wall plate with a wire retention member mounted thereto in accordance with various embodiments of the present disclosure.
Figure 6:
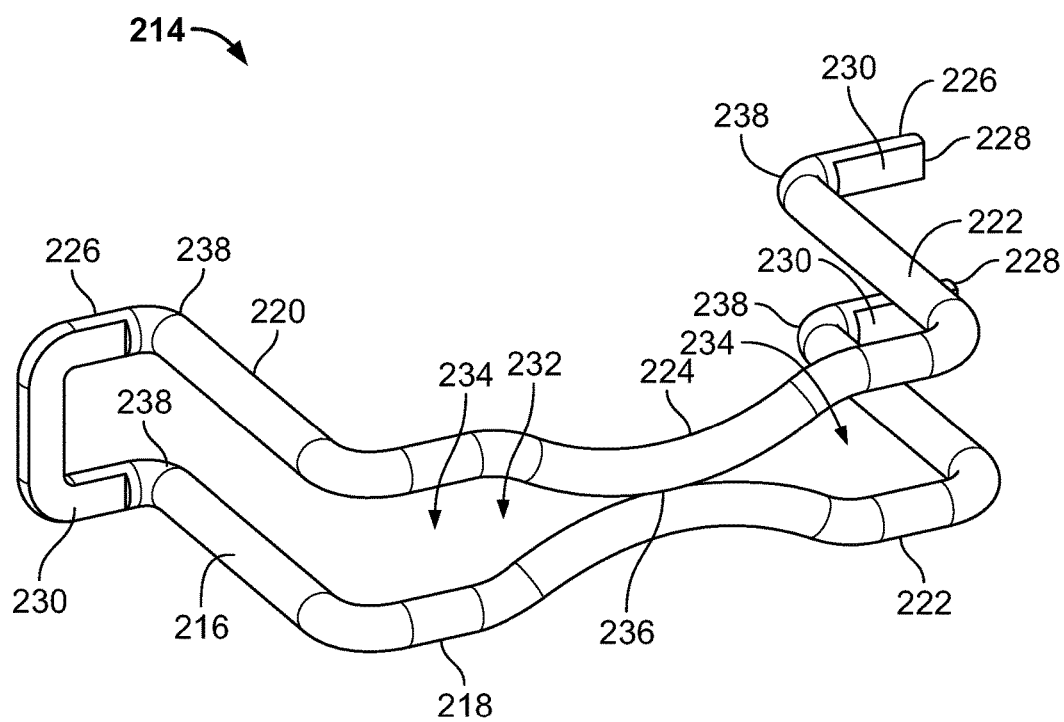
FIG. 6 is a perspective view of the wire retention member of FIG. 5.

In order to provide plug retention, as shown in FIGS. 5 and 6, the wall plate 200 further includes a casing 214 having side portions 216 extending outwardly from the plate 202 and a retention portion 218 extending between the side portions 216 over the window 208. The side portions 216 can be disposed adjacent to the interior edges 206 of the plate 202 and the retention portion 218 can be configured to extend over the USB sockets 14 of the power outlet 10. In some versions, the side portions 216 can have generally the same dimensions, so that the retention portion 218 extends within a plane that runs generally parallel to the plane of the plate 202. Further, the casing 214 can be sized to have a height generally corresponding to a height of the USB sockets 14 to leave the two or three prong sockets 12 fully accessible above and below the casing 214.

The retention portion 218 defines a slot opening 232 that extends in a lateral direction between the side portions 216 to align with the window 208. More specifically, the slot opening 232 extends over the USB sockets 14 with lateral end portions 234 each aligned with one of the USB sockets 14. The slot opening 232 has a width sized to receive the wire 24 of the electrical cord 16 therethrough when the casing 214 retains the USB connector 18 in the socket 14. This configuration allows a user to access and utilize the second connector 26 at the opposite end 28 of the electrical cord 16. In some forms, the slot opening 232 can further include a waisted intermediate portion 236 disposed between the lateral end portions 234.

As shown in FIG. 6, the casing 214 of this embodiment is formed from a rigid, elongate rod member 220 having bends to provide a desired shape and configuration. For example, the side and retention portions 216, 218 can be provided by spaced rods 222. The rods 222 can be spaced a sufficient distance to allow the wire 24 of the electrical cord 16 to pass through the retention portion 218, but closely enough to prevent the body portion 22 from passing therethrough. Further, if desired, the retention portion 218 can include a waist 224 with the rods 222 bent inwardly toward each other.

As with the above embodiment, the side portions 216 can be sized to extend outwardly from the plate 202 a distance associated with the USB connector 18. For example, the distance can be in a range between the length of the body portion 22 and less than a distance of the length of the body portion 22 combined with the plug portion 20. So configured, when the wall plate 200 is secured around the power outlet 10, the retention portion 218 prevents the plug portion 20 from either from being moved or from being fully removed from the USB socket 14.

In some versions, the casing 214 can be separate from the plate 202 and mounted thereto. By one approach, the casing 214 can include tabs 226 that project outwardly from ends 228 of the side portions 216 opposite the retention portion 218. If desired, the rods 222 forming the tabs 226 can have flat outer surfaces 230 to mount to plate 102 as described in more detail below. In the illustrated form, the casing 214 is formed from a single rod member 222 with opposite ends 238 forming one of the tabs 226. Of course, it will be understood that various parts of the casing 214 can be formed from multiple pieces if desired.

Figure 7:
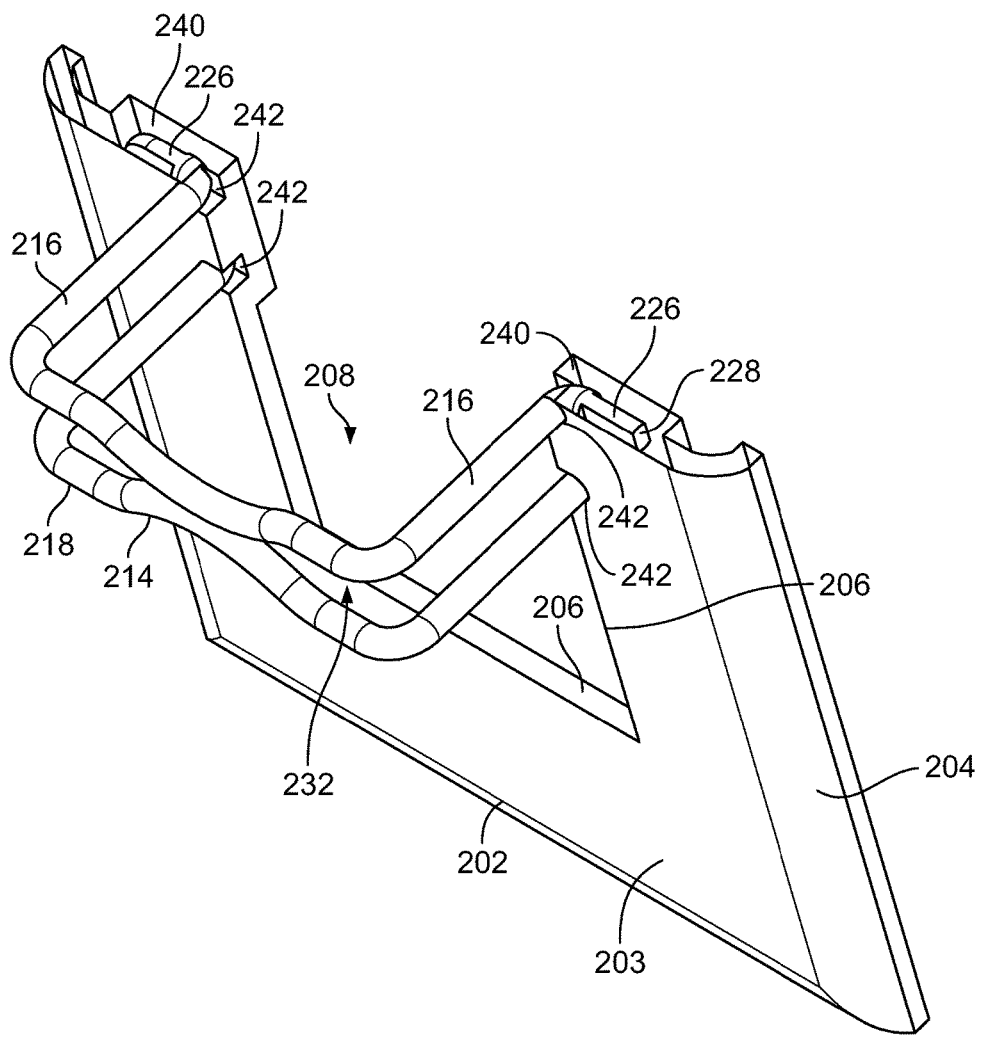
FIG. 7 is a cross-sectional view of the wall plate and wire retention member of FIG. 5 taken along the line 7-7.
Figure 8:
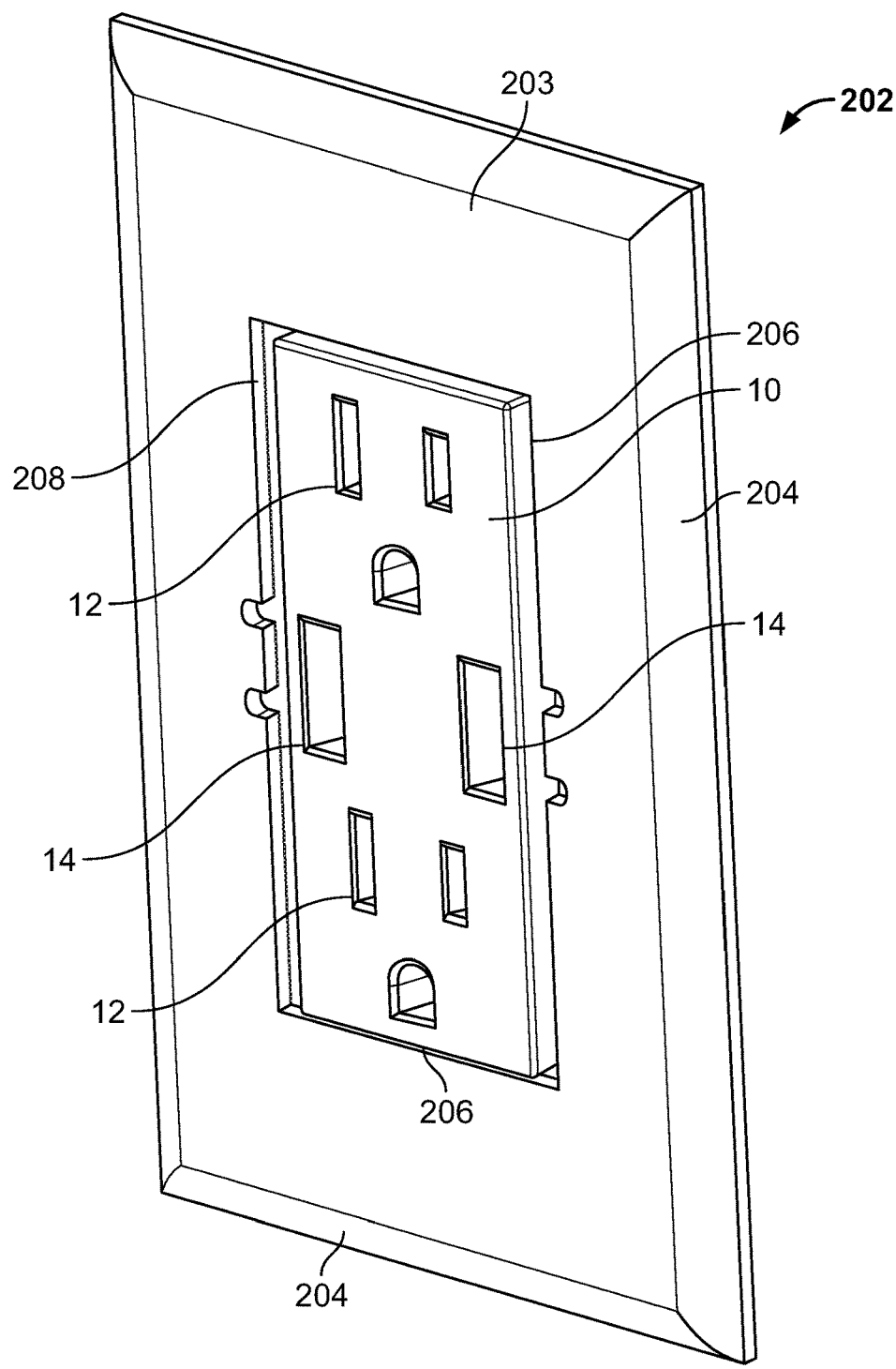
FIG. 8 is a front perspective view of the wall plate of FIG. 5 mounted around a power outlet.
Figure 9:
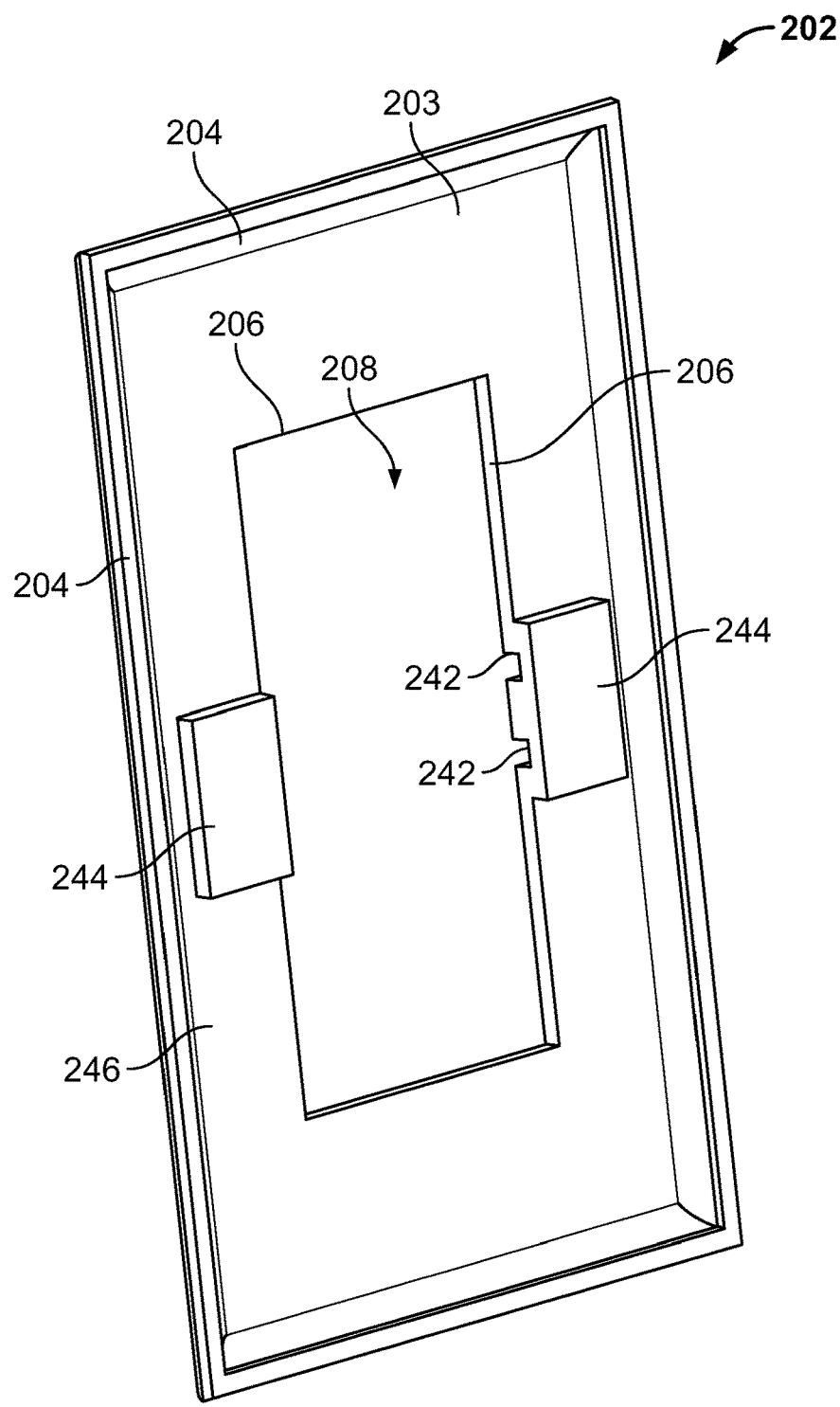
FIG. 9 is a rear perspective view of the wall plate of FIG. 5.

As shown in FIG. 7, the plate 202 can include cavities 240 having openings 242 adjacent to the window 208. The casing 214 is sized so that the tabs 226 can project into the cavities 240 to mount the casing 214 to the plate 202. In versions having the rods 222, the openings 242 can be recesses sized to receive the rods 222 therethrough. The recesses 242 can extend into the plate 202 adjacent to the window 208 such that the recesses 242 open outwardly through the wall 203 and inwardly to the window 208. With is configuration, when the wall plate 200 is mounted to the power outlet 10, structure of the outlet 10 will restrict removal of the rods 222 from the recesses 242. Further, the flat outer surfaces 230 of the tabs 226 can engage the plate 202 to restrict rotation of the rods 222 relative to the plate 202. In order to reduce material costs, as shown in FIG. 9, the recesses 242 can be formed by housings 244 that project outwardly from a rear surface 246 of the plate 202.

It should be appreciated that the foregoing plate 202 is preferably constructed by injection molding, casting, machining, 3D printing, or any other practical and available means known to those skilled in the art. In some versions, the casing 214 can be integrally formed with the plate 202.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A power outlet wall plate for securing a plug of an electrical cord to a power outlet having spaced sockets, the power outlet wall plate comprising:
   a plate including interior edges defining a window opening sized to extend around the power outlet; and
   a casing including side walls and end walls extending outwardly from the plate and a retention wall extending between the side and end walls such that the casing comprises a housing defining an interior, the retention wall defining a slot opening extending over the window opening to align with the sockets of the power outlet,
   wherein the slot opening has lateral portions with a width to receive a cable extending from the plug of the electrical cord therethrough and the side walls are sized so that the retention wall prevents the plug from being removed from the socket with the plate secured around the power outlet, and the end walls include inwardly projecting intermediate portions such that the housing has a waisted configuration.

2. The power outlet wall plate of claim 1, wherein the housing is integral with the plate.

3. The power outlet wall plate of claim 1, wherein the plug comprises a USB plug and the socket comprises a USB socket, the side walls sized so that the retention wall prevents the USB plug from being removed from the USB socket with the plate secured around the power outlet.

4. The power outlet wall plate of claim 1, wherein the casing further comprises a laterally outwardly projecting flange.

5. The power outlet wall plate of claim 4, wherein the flange projects laterally outwardly from the retention wall.

6. A power outlet wall plate for securing a plug of an electrical cord to a power outlet having spaced sockets, the power outlet wall plate comprising:
   a plate including interior edges defining a window opening sized to extend around the power outlet; and
   a casing including side portions extending outwardly from the plate and a retention portion extending between the side portions, the retention portion defining a slot opening extending over the window opening to align with the sockets of the power outlet,
   wherein the slot opening has lateral portions with a width to receive a cable extending from the plug of the electrical cord therethrough and a bulge portion between the lateral portions; and the side portions are sized so that the retention portion prevents the plug from being removed from the socket with the plate secured around the power outlet.

7. The power outlet wall plate of claim 6, wherein the sockets comprise USB sockets spaced laterally from one another and the power outlet further comprises two or three prong sockets spaced longitudinally from one another with the USB sockets disposed therebetween, and wherein the casing is configured to extend over the USB sockets while leaving the two or three prong sockets exposed.

8. The power outlet wall plate of claim 6, wherein the plug comprises a USB plug and the socket comprises a USB socket, the side portions sized so that the retention portion prevents the USB plug from being removed from the USB socket with the plate secured around the power outlet.

9. The power outlet wall plate of claim 6, wherein the casing comprises rod portions mounted to the plate, each of the side portions and the retention portion comprising opposing rod portions.

10. The power outlet wall plate of claim 6, wherein the casing further comprises a laterally outwardly projecting flange.

11. The power outlet wall plate of claim 6, wherein the side portions comprise side walls and the retention portion comprises a retention wall, the casing further comprising end walls extending between the side walls and connected to the retention wall such that the casing comprises a housing defining an interior.

12. The power outlet wall plate of claim 11, wherein the housing further comprises a flange that projects laterally outwardly from the retention wall.

13. The power outlet wall plate of claim 11, wherein the housing is integral with the plate.

14. A power outlet wall plate for securing a plug of an electrical cord to a power outlet having spaced sockets, the power outlet wall plate comprising:
- a plate including interior edges defining a window opening sized to extend around the power outlet; and
- a casing including side portions extending outwardly from the plate and a retention portion extending between the side portions, the retention portion defining a slot opening extending over the window opening to align with the sockets of the power outlet,
- wherein the slot opening has lateral portions with a width to receive a cable extending from the plug of the electrical cord therethrough and a waisted portion between the lateral portions; and the side portions are sized so that the retention portion prevents the plug from being removed from the socket with the plate secured around the power outlet.

15. The power outlet wall plate of claim 14, wherein the casing comprises rod portions mounted to the plate, each of the side portions and the retention portion comprising opposing rod portions.

16. The power outlet wall plate of claim 14, wherein the plug comprises a USB plug and the socket comprises a USB socket, the side portions sized so that the retention portion prevents the USB plug from being removed from the USB socket with the plate secured around the power outlet.

17. The power outlet wall plate of claim 14, wherein the casing further comprises a laterally outwardly projecting flange.

18. The power outlet wall plate of claim 14, wherein the side portions comprise side walls and the retention portion comprises a retention wall, the casing further comprising end walls extending between the side walls and connected to the retention wall such that the casing comprises a housing defining an interior.

19. The power outlet wall plate of claim 18, wherein the end walls include inwardly projecting intermediate portions such that the housing has a waisted configuration.

20. The power outlet wall plate of claim 18, wherein the housing further comprises a flange that projects laterally outwardly from the retention wall.

21. The power outlet wall plate of claim 18, wherein the housing is integral with the plate.

22. A power outlet wall plate for securing a plug of an electrical cord to a power outlet having laterally spaced USB sockets and longitudinally spaced two or three prong sockets with the USB sockets disposed therebetween, the power outlet wall plate comprising:
- a plate including interior edges defining a window opening sized to extend around the power outlet; and
- a casing including side portions extending outwardly from the plate and a retention portion extending between the side portions to extend over the USB sockets while leaving the two or three prong sockets exposed, the retention portion defining a slot opening extending over the window opening to align with the USB sockets of the power outlet,
- wherein the slot opening has lateral portions with a width to receive a cable extending from the plug of the electrical cord therethrough and the side portions are sized so that the retention portion prevents the plug from being removed from the USB socket with the plate secured around the power outlet.

23. The power outlet wall plate of claim 22, wherein the casing further comprises a laterally outwardly projecting flange.

24. The power outlet wall plate of claim 22, wherein the retention portion extends in a plane generally parallel to a plane of the window opening.

25. The power outlet wall plate of claim 22, wherein the slot opening comprises a bulge portion between the lateral portions.

26. The power outlet wall plate of claim 22, wherein the slot opening comprises a waisted portion between the lateral portions.

27. The power outlet wall plate of claim 22, wherein the slot opening is spaced inwardly from edges of the retention portion.

28. The power outlet wall plate of claim 22, wherein the casing comprises rod portions mounted to the plate, each of the side portions and the retention portion comprising opposing rod portions.

29. The power outlet wall plate of claim 28, wherein the casing further comprises tabs projecting outwardly from ends of the side portions opposite the retention portion and the plate comprises recesses having openings into the window portion to receive the tabs to mount the casing to the plate.

30. The power outlet wall plate of claim 28, wherein the casing comprises a continuous rod member bent to form the side and retention portions.

31. The power outlet wall plate of claim 22, wherein the side portions comprise side walls and the retention portion comprises a retention wall, the casing further comprising end walls extending between the side walls and connected to the retention wall such that the casing comprises a housing defining an interior.

32. The power outlet wall plate of claim 31, wherein the housing is integral with the plate.

33. The power outlet wall plate of claim 31, wherein the housing further comprises a flange that projects laterally outwardly from the retention wall.

34. The power outlet wall plate of claim 31, wherein the end walls include inwardly projecting intermediate portions such that the housing has a waisted configuration.

* * * * *